(12) United States Patent
Ovalles et al.

(10) Patent No.: US 9,670,760 B2
(45) Date of Patent: Jun. 6, 2017

(54) PROCESS FOR IN SITU UPGRADING OF A HEAVY HYDROCARBON USING ASPHALTENE PRECIPITANT ADDITIVES

(71) Applicant: Chevron U.S.A. Inc., San Ramon, CA (US)

(72) Inventors: Cesar Ovalles, Walnut Creek, CA (US); Estrella Rogel, Orinda, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 14/066,993

(22) Filed: Oct. 30, 2013

(65) Prior Publication Data

US 2015/0114635 A1    Apr. 30, 2015

(51) Int. Cl.
*E21B 43/22* (2006.01)
*E21B 43/16* (2006.01)
(Continued)

(52) U.S. Cl.
CPC .............. *E21B 43/16* (2013.01); *C09K 8/594* (2013.01); *C10G 73/38* (2013.01);
(Continued)

(58) Field of Classification Search
CPC ...... E21B 43/16; E21B 43/24; E21B 43/2408; E21B 43/28; E21B 43/00; E21B 43/25; C09K 8/58; C10G 1/04; C10G 1/002
See application file for complete search history.

(56) References Cited

U.S. PATENT DOCUMENTS 2,412,765 A   12/1946   Buddrus et al.
3,351,132 A   11/1967   Dougan et al.
(Continued)

FOREIGN PATENT DOCUMENTS

CA    2779238    12/2013

OTHER PUBLICATIONS

SPE 25452, In-Situ Upgrading of Heavy Oils and Bitumen by Propane Deasphalting: The Vapex Process, Mokrys, et al;, Society of Petroleum Engineers, Inc., Mar. 21-23, 1993.
(Continued)

*Primary Examiner* — Zakiya W Bates
(74) *Attorney, Agent, or Firm* — Karen R. DiDomenicis; M. Carmen & Associates (57) ABSTRACT

A process for in-situ upgrading of a heavy hydrocarbon includes positioning a well in a reservoir containing a heavy hydrocarbon having an initial API gravity no greater than about 20, an n-heptane asphaltene content at least about 1 wt. %, and a viscosity at 35° C. greater than about 350 centistokes; injecting hydrocarbon solvent(s) and asphaltene precipitant additive(s) into the well at a ratio by volume of the solvent to the heavy hydrocarbon of about 0.1:1 to about 20:1 under reservoir conditions so as to provide an upgraded hydrocarbon in the reservoir having an improved API gravity, a reduced asphaltene content, and a lower viscosity; and producing the upgraded hydrocarbon from the well. The process of the present invention can be also carried out at higher temperatures such as by injecting steam with the one or more hydrocarbon solvents and the one or more asphaltene precipitant additives into the well.

26 Claims, 6 Drawing Sheets (51) Int. Cl.
  *C09K 8/594* (2006.01)
  *C10G 73/38* (2006.01)
  *E21B 43/28* (2006.01)
(52) U.S. Cl.
  CPC .... *C09K 2208/10* (2013.01); *C10G 2300/302* (2013.01); *C10G 2300/4037* (2013.01); *E21B 43/28* (2013.01)

(56) References Cited

U.S. PATENT DOCUMENTS

| | | |
|---|---|---|
| 3,386,513 A | 6/1968 | Holmes |
| 3,945,435 A | 3/1976 | Barry |
| 3,954,141 A | 5/1976 | Allen et al. |
| 4,007,785 A * | 2/1977 | Allen et al. ............... 166/272.1 |
| 4,008,764 A | 2/1977 | Allen |
| 4,223,728 A | 9/1980 | Pegg |
| 4,280,559 A | 7/1981 | Best |
| 4,344,485 A | 8/1982 | Butler |
| 4,362,212 A | 12/1982 | Schulz |
| 4,362,213 A | 12/1982 | Tabor |
| 4,372,383 A | 2/1983 | Ames |
| 4,418,752 A | 12/1983 | Boyer et al. |
| 4,450,913 A | 5/1984 | Allen et al. |
| 4,513,819 A | 4/1985 | Islip et al. |
| 4,531,586 A | 7/1985 | McMillen |
| 4,560,003 A | 12/1985 | McMillen |
| 4,643,252 A | 2/1987 | Kovarik |
| 4,753,293 A | 6/1988 | Bohn |
| 5,018,576 A | 5/1991 | Udell et al. |
| 5,131,471 A | 7/1992 | Duerksen et al. |
| 5,214,224 A * | 5/1993 | Comer et al. .................... 585/3 |
| 5,388,644 A | 2/1995 | Romocki |
| 5,407,009 A | 4/1995 | Butler et al. |
| 5,425,422 A | 6/1995 | Jamaluddin et al. |
| 5,607,016 A | 3/1997 | Butler |
| 5,771,973 A | 6/1998 | Jensen et al. |
| 5,891,829 A | 4/1999 | Vallejos et al. |
| 5,899,274 A | 5/1999 | Frauenfeld et al. |
| 6,230,814 B1 | 5/2001 | Nasr et al. |
| 6,318,464 B1 | 11/2001 | Mokrys |
| 6,405,799 B1 | 6/2002 | Vallejos et al. |
| 6,511,601 B2 | 1/2003 | McMurtrey et al. |
| 6,662,872 B2 | 12/2003 | Gutek et al. |
| 6,883,607 B2 | 4/2005 | Nenniger et al. |
| 8,846,582 B2 | 9/2014 | Hughes et al. |
| 2007/0062698 A1* | 3/2007 | Smith et al. ................. 166/279 |
| 2012/0090220 A1* | 4/2012 | Dieckmann et al. ............ 44/282 |
| 2013/0334097 A1* | 12/2013 | Patino et al. ................... 208/14 |
| 2013/0334100 A1* | 12/2013 | Mazyar et al. ............... 208/106 |

OTHER PUBLICATIONS

Christina Lake Solvent Aided Process Pilot, Gupta, et al., Paper 2005-190, Canadian International Petroleum Conference, Jun. 7-9, 2005, Calgary, Alberta, Canada.
Rogel, Estrella, et al.; "Determination of Asphaltenes in Crude Oil and Petroleum Products by the on Column Precipitation Method"; Energy Fuels (2009), vol. 23, pp. 4515-4521.
International Search Report, issued on Feb. 4, 2015, during the prosecution of International Application No. PCT/US2004/061922.
Written Opinion of the International Searching Authority, issued on Feb. 4, 2015, during the prosecution of International Application No. PCT/US2004/061922.

* cited by examiner

PROCESS FOR IN SITU UPGRADING OF A HEAVY HYDROCARBON USING ASPHALTENE PRECIPITANT ADDITIVES

BACKGROUND OF THE INVENTION

Technical Field

The present invention generally relates to a process for in situ upgrading of a heavy hydrocarbon in the presence of one or more asphaltene precipitant additives.

Description of the Related Art

Subsurface upgrading of heavy oil (HO) has always been of interest to the petroleum industry mainly because of the intrinsic advantages compared with aboveground counterparts. The main advantages are: lower lifting and transportation costs from the underground to the refining centers with the potential increase of the volumetric production of wells and in the value of the upgraded oil, decrease in consumption of costly light and medium petroleum oils used as solvents for HO production, move estimated and probable HO reserves to proved reserves, possibility of reducing capital and operating expenses of Upgrader Units by performing the upgrading subsurface and use of porous media (a mineral formation) as a natural chemical "catalytic reactor" to further improve the properties of upgraded crude oil. However, there are significant challenges that have to be addressed to accomplish a successful downhole upgrading process.

A number of methods have been proposed for producing such heavy hydrocarbons. These methods include the use of multiple wells including parallel horizontal wells drilled into water formations beneath the heavy hydrocarbon, and injection of various additives through the horizontal wells so as to assist in production from a separate well drilled into the producing formation. Unfortunately, this method requires the actual drilling of a potentially large number of wells for production from a single well, with the attendant increase in cost of labor and equipment, and also results in large amounts of potentially expensive additives being injected through the horizontal wells.

"Huff and puff" or cyclic pressurizing and production techniques are also known wherein a well is pressurized for a period of time, and then allowed to produce. This method can provide enhanced production for certain wells. However, with particularly heavy hydrocarbons, this technique certainly leaves room for improvement.

In SPE paper No. 25452, a process for the in-situ upgrading of heavy oils and bitumen by propane deasphalting is proposed. This process utilizes two parallel horizontal wells, as reported in the Steam Assisted Gravity Drainage process (SAGD), but with the steam chamber being replaced by a chamber containing hydrocarbon vapor near its dew point. In this process, cold propane is continuously injected for the top horizontal well and the upgraded heavy oil/solvent blend is produced from the bottom well. The heavy oil is upgraded in terms of permanent viscosity reduction via solvent deasphalting.

Gupta and Gittins (Conference paper No. 2005-190 presented at Canadian International Petroleum Conference, Jun. 7-9, 2005, Calgary, Alberta) reported the field testing of a solvent aided process which involves the co-injection of a hydrocarbon solvent and steam during SAGD operation. The authors observed increases up to one degree of the API gravity of the produced oil.

In U.S. Pat. No. 6,883,607 ("the '607 patent"), a process for the recovery of hydrocarbons is disclosed which involves the use of warm solvents to extract heavy oil from oil bearing formation. In the '607 patent, the solvent is continuously injected downhole and placed into the formation at a temperature and pressure sufficient for the solvent to be in the vapor state and to condense on the extraction surface. Then, a solvent-heavy oil blend is produced and, after solvent separation and purification, it is re-injected into the formation again. The '607 patent further discloses that the presence of the solvent in the heavy oil leads to precipitation of asphaltenes which upgrades the heavy oil via improvements in the API and reduction of metals and sulfur contents and Conradson carbon.

Another example is U.S. Pat. No. 6,405,799 ("the '799 patent") which discloses a process for in situ upgrading of a heavy hydrocarbon. The process disclosed in the '799 patent includes the steps of (a) positioning a well in a reservoir containing a heavy hydrocarbon having an initial API gravity of less than or equal to about 8; (b) injecting a light solvent into the well at reservoir conditions so as to provide an upgraded hydrocarbon in the reservoir, the upgraded hydrocarbon having an improved API gravity greater than the initial API gravity; and (c) producing the upgraded hydrocarbon from the well.

In all of the mentioned prior art, the use of large amounts of solvent is required in order to precipitate asphaltenes downhole to upgrade of the heavy oil, as measured by, for example, API gravity increase and permanent viscosity reduction. Independent of the type of process, for example, Huff and Puff (discontinuous) or continuous solvent injection such as SAGD, the solvent to produced-heavy oil ratios used in the field are in the range of 0.5 up to 10 (v/v). These high solvent-to-heavy-oil ratios not only increase the operating expenses of the process due to the need of high solvent inventories but also increase the capital costs due to larger size surface facilities for solvent separation, purification and recycling. Additionally, due to loss of injected solvent to thief or cracked zones present in the reservoir, there is a need for solvent make-up that further increases the operating costs of the downhole upgrading processes.

Accordingly, it would be desirable to provide improved processes for in situ upgrading of heavy crude oils that can be carried out with lower operating and capital expenses in a simple and cost efficient manner.

SUMMARY OF THE INVENTION

In accordance with one embodiment of the present invention, there is provided a process for in situ upgrading of a heavy hydrocarbon comprising the steps of:

(a) positioning a well in a reservoir containing a heavy hydrocarbon having an initial API gravity of less than or equal to about 20, an n-heptane asphaltene content as measured by the ASTM D-6560 of at least about 1 wt. %, and a viscosity at 35° C. greater than about 350 centistokes (cSt);

(b) injecting one or more hydrocarbon solvents and one or more asphaltene precipitant additives into the well in any order at a ratio by volume of the solvent to the heavy hydrocarbon of at least from about 0.1:1 to about 20:1 under reservoir conditions so as to provide an upgraded hydrocarbon in the reservoir, wherein the upgraded hydrocarbon has an improved API gravity greater than the initial API gravity, a reduction in the asphaltene content, and a lower viscosity; and (c) producing the upgraded hydrocarbon from the well.

In another embodiment the ratio by volume of the solvent to the heavy hydrocarbon of at least from about 0.1:1 to about 1.5:1 may be injected. In yet another embodiment, the ratio by volume of the solvent to the heavy hydrocarbon of at least from about 0.1:1 to less than 1:1 may be employed. Further, in an additional embodiment, the ratio by volume of the solvent to the heavy hydrocarbon of at least from about 0.1:1 to about 0.9:1 may be injected.

In accordance with a second embodiment of the present invention, there is provided a method for transporting an upgraded hydrocarbon, the method comprising the steps of:
(a) providing an upgraded hydrocarbon obtained by the process comprising the steps of:
  (i) positioning a well in a reservoir containing a heavy hydrocarbon having an initial API gravity of less than or equal to about 20, an n-heptane asphaltene content as measured by the ASTM D-6560 of at least about 1 wt %, and a viscosity at 35° C. greater than about 350 centistokes (cSt);
  (ii) injecting one or more light solvents and one or more asphaltene precipitant additives into the well in any order at a ratio by volume of the solvent to the heavy hydrocarbon of at least from about 0.1:1 to about 20:1 under reservoir conditions so as to provide an upgraded hydrocarbon in the reservoir, wherein the upgraded hydrocarbon has an improved API gravity greater than the initial API gravity, a reduction in the asphaltene content, and a lower viscosity; and
  (iii) producing the upgraded hydrocarbon from the well; and
(b) transporting the upgraded hydrocarbon to a treatment facility or a transportation carrier.

Alternatively, the ratio by volume of the solvent to the heavy hydrocarbon of at least from about 0.1:1 to about 1.5:1 may be injected. In yet another embodiment, the ratio by volume of the solvent to the heavy hydrocarbon of at least from about 0.1:1 to less than 1:1 may be employed. Further, in an additional embodiment, the ratio by volume of the solvent to the heavy hydrocarbon of at least from about 0.1:1 to about 0.9:1 may be injected.

In accordance with a third embodiment of the present invention, there is provided a process for in situ upgrading of a heavy hydrocarbon comprising the steps of:
(a) positioning a well in a reservoir containing a heavy hydrocarbon having an initial API gravity of less than or equal to about 20, an n-heptane asphaltene content as measured by the ASTM D-6560 of at least about 1 wt. %, and a viscosity at 35° C. greater than about 350 centistokes (cSt);
(b) injecting steam, one or more hydrocarbon solvents and one or more asphaltene precipitant additives into the well in any order at a ratio by volume of the solvent to the heavy hydrocarbon of at least from about 0.1:1 to about 20:1 and a ratio by volume steam to hydrocarbon solvent from about 0.1:1 to about 5:1 under reservoir conditions so as to provide an upgraded hydrocarbon in the reservoir, wherein the upgraded hydrocarbon has an improved API gravity greater than the initial API gravity, a reduction in the asphaltene content, and a lower viscosity; and
(c) producing the upgraded hydrocarbon from the well.

In another embodiment the ratio by volume of the solvent to the heavy hydrocarbon of at least from about 0.1:1 to about 1.5:1 may be injected. In yet another embodiment, the ratio by volume of the solvent to the heavy hydrocarbon of at least from about 0.1:1 to less than 1:1 may be employed. Further, in an additional embodiment, the ratio by volume of the solvent to the heavy hydrocarbon of at least from about 0.1:1 to about 0.9:1 may be injected.

A heavy hydrocarbon having an initial API gravity of less than or equal to about 20 can advantageously be in situ upgraded by positioning a well in a reservoir containing the heavy hydrocarbon and injecting one or more hydrocarbon solvents and one or more asphaltene precipitant additives into the well in any order at a ratio by volume of the solvent to the heavy hydrocarbon of at least from about 0.1:1 to about 20:1 under reservoir conditions so as to provide an upgraded hydrocarbon in the reservoir. By using asphaltene precipitant additives, lower solvent to heavy hydrocarbon ratio are used thereby resulting in concomitant savings in operating and capital expenses.

DETAILED DESCRIPTION OF THE PREFERRED EMBODIMENTS

The present invention is directed to a process for in situ upgrading of a heavy hydrocarbon comprising the steps of (a) positioning a well in a reservoir containing a heavy hydrocarbon having an initial API gravity of less than or equal to about 20, an n-heptane asphaltene content as measured by the ASTM D-6560 of at least about 1 wt. %, and a viscosity at 35° C. greater than about 350 centistokes (cSt); (b) injecting one or more hydrocarbon solvents and one or more asphaltene precipitant additives into the well in any order at a ratio by volume of the solvent to the heavy hydrocarbon of at least from about 0.1:1 to less than 20:1 under reservoir conditions so as to provide an upgraded hydrocarbon in the reservoir, wherein the upgraded hydrocarbon has an improved API gravity greater than the initial API gravity, a reduction in the asphaltene content, and a lower viscosity; and (c) producing the upgraded hydrocarbon from the well.

In general, the heavy hydrocarbon having an initial API gravity of less than or equal to about 20, an n-heptane asphaltene content as measured by the ASTM D-6560 of at least about 1 wt. %, and a viscosity at 35° C. greater than about 350 centistokes (cSt) is an asphaltene-containing liquid crude hydrocarbon. Asphaltenes, are a mixed solubility class of compounds as opposed to a chemical class of compounds, generally solid in nature and comprise polynuclear aromatics present in the solution of smaller aromatics and resin molecules, and are also present in the crude oils and heavy fractions in varying quantities. Asphaltenes do not usually exist in all of the condensates or in light crude oils; however, they are present in relatively large quantities in heavy crude oils and petroleum fractions. Asphaltenes are insoluble components or fractions and their concentrations are defined as the amount of asphaltenes precipitated by addition of an n-paraffin solvent to the feedstock which are completely soluble in aromatic solvents, as prescribed in the Institute of Petroleum Method IP-143.

In one embodiment, the heavy hydrocarbon has an initial API gravity of from about 5 to about 20, an n-heptane asphaltene content as measured by the ASTM D-6560 of at least about 1 wt. % and up to about 15 wt. %, and a viscosity at 35° C. greater than about 350 cSt and up to about 100,000 cSt. In one embodiment, the heavy hydrocarbon has an initial API gravity of from about 8 to about 20, an n-heptane asphaltene content as measured by the ASTM D-6560 of at least about 1 wt. % and up to about 10 wt. %, and a viscosity at 35° C. greater than about 350 cSt and up to about 70,000. Viscosity measurements are determined herein according to ASTM D445.

Figure 1:
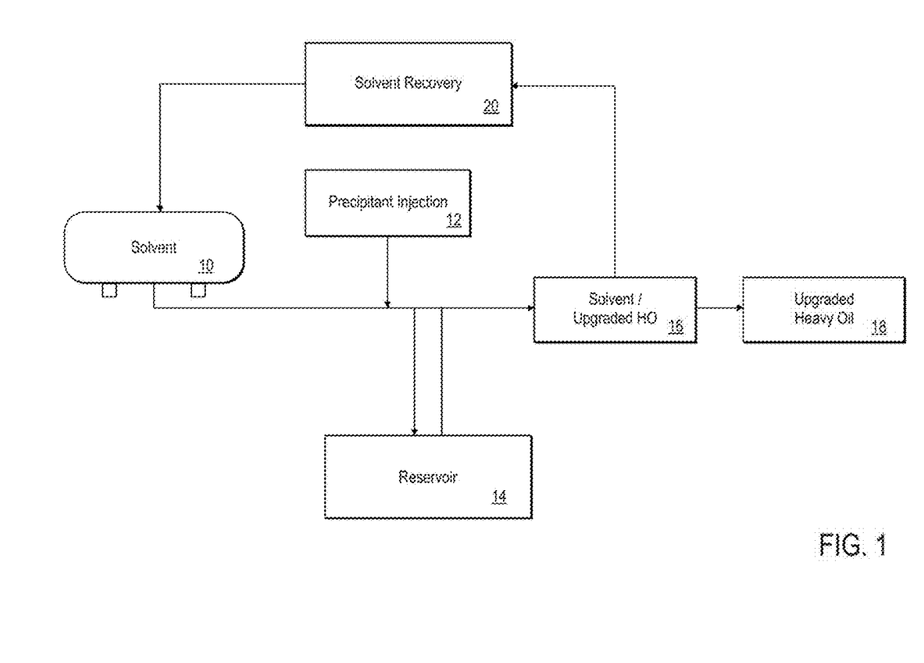
FIG. 1 is a diagram for the process for in situ upgrading of a heavy hydrocarbon via solvent deasphalting using asphaltene precipitant additives.

Referring now to FIG. 1, a process in accordance with the present invention is schematically illustrated. As shown, a volume of hydrocarbon solvent 10 and one or more asphaltene precipitant additives 12 are provided and injected into a well in a producing reservoir 14 in any order at the desired ratio of solvent to heavy hydrocarbon. Following a desired injection time, the same well is then operated at production conditions, i.e., reservoir conditions, so as to produce a volume 16 of upgraded hydrocarbon oil and hydrocarbon solvent, which is separated so as to provide a final produced upgraded hydrocarbon oil product 18 having the desired improved characteristics and a recovered hydrocarbon solvent portion 20 which can be recycled for use in the initial injection step as desired. This advantageously avoids the need for additional wells, be they horizontal wells or otherwise, and also serves to minimize the amount of solvent or other additive injection, and provides for ease in recovery and recycling of same. Thus, the process of the present invention is advantageous in terms of cost of equipment, raw materials and labor. Furthermore, the process of the present invention advantageously provides for upgrading and production of heavy hydrocarbons which cannot otherwise be economically produced.

The wells to be positioned in the reservoir are well known and include, by way of example, vertical, horizontal or slanted wells. In addition, the well can also be in a SAGD well configuration in which there is a top horizontal injector and a parallel bottom horizontal producer. In a standard SAGD, a horizontal production well is drilled into the oil reservoir penetrating the surface of the earth and overburden materials. The reservoir is bounded on the top and bottom by one surface, the bottom of the overburden, and by another surface, the top of the understrata. Above the oil reservoir is the overburden, which is of any one or more of shale, rock, sand layers, and aquifers. A horizontal injection well, typically aligned vertically between five and ten meters above the production well is also drilled into the reservoir. In standard SAGD, steam is injected into the reservoir through the injection well and flows into the steam depletion chamber. In substantially vapor form, steam flows to the edges of the chamber, condenses, and delivers its latent heat to the tar sand within the reservoir unit. As reservoir fluids are produced to the surface with the production well, the steam chamber expands further into the oil reservoir. The injected steam acts to deliver both heat and pressure to the reservoir. After the oil in the reservoir is heated, its viscosity falls, it becomes more mobile, and it flows under gravity to the production well.

Figure 2:
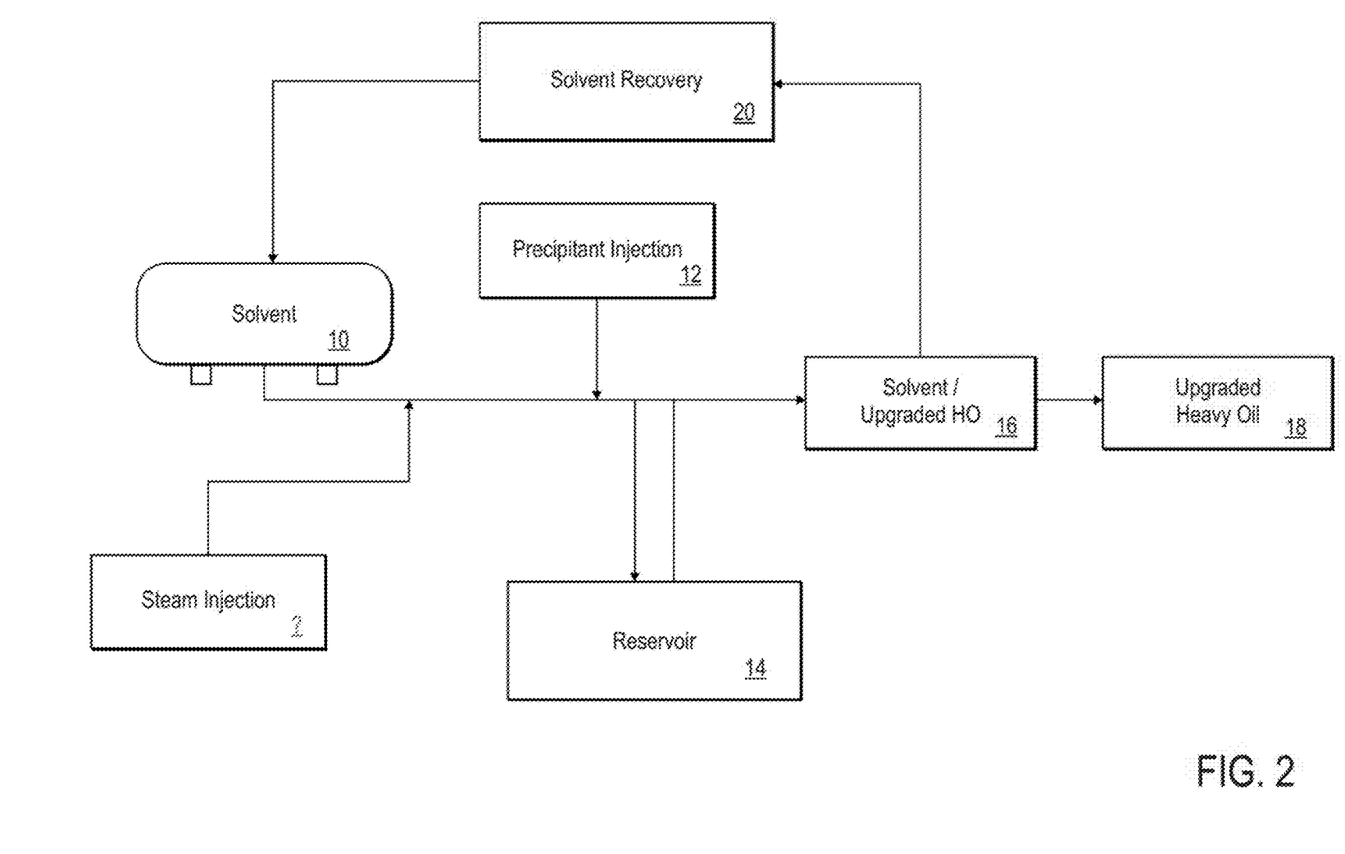
FIG. 2 is a diagram for the process for in situ upgrading of a heavy hydrocarbon via solvent deasphalting using a SAGD and asphaltene precipitant additives.

In the embodiment shown in FIG. 2., the process for in situ upgrading of a heavy hydrocarbon involves the steps of (a) positioning the horizontal wells in a SAGD configuration in a reservoir containing a heavy hydrocarbon having an initial API gravity of less than or equal to about 20, an n-heptane asphaltene content as measured by the ASTM D-6560 of at least about 1 wt. %, and a viscosity at 35° C. greater than about 350 centistokes (cSt); (b) injecting steam 22 with one or more hydrocarbon solvents and one or more asphaltene precipitant additives into the well in any order at a ratio by volume of the solvent to the heavy hydrocarbon of at least from about 0.1:1 to about 20:1 under reservoir conditions so as to provide an upgraded hydrocarbon in the reservoir, wherein the upgraded hydrocarbon has an improved API gravity greater than the initial API gravity, a reduction in the asphaltene content, and a lower viscosity; and (c) producing the upgraded hydrocarbon from the well.

The one or more hydrocarbon solvents for use in the process of the present invention include one or more $C_1$-$C_8$ hydrocarbon solvents. Examples of such solvents include methane, ethane, propane, butane and mixtures thereof. In addition, the hydrocarbon solvents can also comprise $C_1$-$C_{10}$ fractions. Additionally cycle-paraffins such as cycle-pentane, cycle-hexane and mixtures thereof can also be used in the process of the present invention.

In general, the one or more hydrocarbon solvents are injected into the well at a ratio by volume of the solvent to the heavy hydrocarbon of at least from about 0.1:1 to about 20:1. In one embodiment, the one or more hydrocarbon solvents are injected into the well at a ratio by volume of the solvent to the heavy hydrocarbon of about 0.1:1 to about 20:1. For the purposes of this application, the ratio of the solvent to oil (or estimated oil-in-place) is expressed as volume/volume.

The one or more asphaltene precipitant additives for use in the process of the present invention includes peroxide containing asphaltene precipitant additives, polymeric methacrylate containing asphaltene precipitant additives, nanoparticles of metal oxides, sulphonic acid containing asphaltene precipitant additives and the like and mixtures thereof. In general, the one or more asphaltene precipitant additives are injected into the heavy hydrocarbon at a ratio by weight of the one or more asphaltene precipitant additives to the one or more hydrocarbon solvents of at least from about 10 ppm:1 to about 10000 ppm:1. For the purposes of this application, the ratio of precipitant additive/solvent is measured as weight/weight, i.e. milligrams/kilograms in the laboratory. In the field, the ratio may be expressed as kilogram/1000 Ton (1000 kilograms). In one embodiment, the one or more asphaltene precipitant additives are injected into the heavy hydrocarbon at a weight ratio of the one or more asphaltene precipitant additives to the one or more light solvents of at least from about 50 ppm:1 to about 1000 ppm:1.

Representative examples of one or more peroxide asphaltene precipitant additives include lauroyl peroxide, benzoyl peroxide, 2,4-dichlorobenzoyl peroxide, m-toluoyl peroxide, peroxyacetic acid, 2,5-oxanoyl peroxide, succinic peroxide, diisopropylbenzene hydroperoxide, paramethane hydroperoxide, pinane hydroperoxide, cumene hydroperoxide, p-menthane hydroperoxide, tert-butyl peroxyacetate, tert-butyl peroxypivalate, tert-butyl peroxyneodecanoate, tert-butyl peroxyoctanoate, methyl ethyl ketone peroxide, acetone peroxide, acetylacetone peroxide, cyclohexanone peroxide, methylcyclohexanone peroxide, m-chloroperoxybenzoic acid, di-t-butyl peroxide, t-butylcumyl peroxide, t-butyl hydroperoxide, 2,5-dimethylhexane-2,5-dihydroperoxide, 2,5-dimethyl-2,5-di(t-butylperoxy)hexane, 1,1-bis(t-butyl-peroxy)cyclohexane, 2,2-bis(tert-butylperoxy)-butane, 2,5-dimethyl-2,5-dibenzoylperoxy-hexane, 1,3-bis(t-butyl-peroxyisopropyl)-benzene, 3,3,5-trimethylcyclohexanone peroxide, 1,1-bis(t-butyl-peroxy)-3,3,5-trimethylcyclohexane, dicumyl peroxide, dimethylstyryl peroxydicarbonate and the like and mixtures thereof.

Representative examples of one or more polymeric methacrylate asphaltene precipitant additives include polymeric 4-vinyl pyridine methacrylate, 4-vinyl phenol methacrylate, polymaleic anhydride and mixtures thereof.

Representative examples of nanoparticles of metal oxides as one or more asphaltene precipitant additives include nanoparticles of metal oxides wherein the metal is selected from the group consisting of a Group 8 metal, Group 9 metal, Group 10 metal, copper and zinc. Representative examples of nanoparticles of metal oxides as one or more asphaltene precipitant additives include nanoparticles of iron oxide, nickel oxide, ruthenium oxide, platinum oxide, palladium oxide and the like and mixtures thereof.

Representative examples of sulphonic acid containing asphaltene precipitant additives include aromatic sulfonic acid or salt thereof, an aliphatic sulfonic acid or salt thereof and the like and mixtures thereof.

In general, the aromatic sulfonic acids or salts thereof include alkyl aromatic sulfonic acids or salts thereof obtained by the alkylation of an aromatic compound. The alkyl aromatic is then sulfonated to form an alkyl aromatic sulfonic acid. If desired the alkyl aromatic sulfonic acid can be neutralized with caustic to obtain a sodium alkyl aromatic sulfonate compound.

At least one aromatic compound or a mixture of aromatic compounds may be used to form the aromatic sulfonic acid or salt thereof. Suitable aromatic compounds or the aromatic compound mixture comprise at least one of monocyclic aromatics, such as benzene, toluene, xylene, cumene or mixtures thereof. In one embodiment, the at least one aromatic compound or aromatic compound mixture is xylene, including all isomers (i.e., meta-, ortho- and para-), and mixtures thereof. In one preferred embodiment, the at least one aromatic compound is ortho-xylene.

The at least one aromatic compound or the mixture of aromatic compounds is commercially available or may be prepared by methods that are well known in the art.

As noted above, the aromatic compound may be alkylated to form an alkyl aromatic compound. The alkylating agent employed to alkylate the aromatic compound may be derived from a variety of sources. Such sources include the normal alpha olefins, linear alpha olefins, isomerized linear alpha olefins, dimerized and oligomerized olefins, and olefins derived from olefin metathesis. The olefin may be a single carbon number olefin, or it may be a mixture of linear olefins, a mixture of isomerized linear olefins, a mixture of branched olefins, a mixture of partially branched olefins, or a mixture of any of the foregoing. Another source from which the olefins may be derived is through cracking of petroleum or Fischer-Tropsch wax. The Fischer-Tropsch wax may be hydrotreated prior to cracking. Other commercial sources include olefins derived from paraffin dehydrogenation and oligomerization of ethylene and other olefins, methanol-to-olefin processes (methanol cracker) and the like.

The olefins may selected from olefins with carbon numbers ranging from about 8 carbon atoms to about 60 carbon atoms. In one embodiment, the olefins are selected from olefins with carbon numbers ranging from about 10 to about 50 carbon atoms. In one embodiment, the olefins are selected from olefins with carbon numbers ranging from about 12 to about 40 carbon atoms.

In another embodiment, the olefin or the mixture of olefins is selected from linear alpha olefins or isomerized olefins containing from about 8 to about 60 carbon atoms. In one embodiment, the mixture of olefins is selected from linear alpha olefins or isomerized olefins containing from about 10 to about 50 carbon atoms. In one embodiment, the mixture of olefins is selected from linear alpha olefins or isomerized olefins containing from about 12 to about 40 carbon atoms.

In one embodiment, the mixture of branched olefins is selected from polyolefins which may be derived from $C_3$ or higher monoolefins (e.g., propylene oligomers, butylenes oligomers, or co-oligomers etc.). In one embodiment, the mixture of branched olefins is either propylene oligomers or butylenes oligomers or mixtures thereof.

The linear olefins that may be used for the alkylation reaction may be one or a mixture of normal alpha olefins selected from olefins having from about 8 to about 60 carbon atoms per molecule. In one embodiment, the normal alpha olefin is selected from olefins having from about 10 to about 50 carbon atoms per molecule. In one embodiment, the normal alpha olefin is selected from olefins having from about 12 to about 40 carbon atoms per molecule.

In one embodiment, the aromatic compound is alkylated with a mixture of normal alpha olefins containing from $C_8$ to $C_{60}$ carbon atoms. In one embodiment, the aromatic compound is alkylated with a mixture of normal alpha olefins containing from $C_{10}$ to $C_{50}$ carbon atoms. In another embodiment, the aromatic compound is alkylated with a mixture of normal alpha olefins containing from $C_{12}$ to $C_{40}$ carbon atoms to yield an aromatic alkylate.

The normal alpha olefins employed to make the alkylaromatic sulfonic acid or salt thereof are commercially available or may be prepared by methods that are well known in the art.

In general, the one or more hydrocarbon solvents and one or more asphaltene precipitant additives are injected into the well in any order at a ratio by volume of the solvent to the heavy hydrocarbon of at least from about 0.1:1 to about 20:1 under reservoir conditions so as to provide an upgraded hydrocarbon in the reservoir. Reservoir conditions include, by way of example, a temperature of between about 40° C. and about 140° C. and a pressure of between about 250 psia and about 2500 psia. In addition, the one or more hydrocarbon solvents and one or more asphaltene precipitant additives are injected into the well for a sufficient period of time to produce the upgraded hydrocarbon, e.g., a time period of at least about 1 hr, or at least about 1 day, e.g., from 1 hour up to 24 hours.

In one embodiment, downhole injection of the one or more hydrocarbon solvents can be carried out using conventional pumps as in in petroleum field applications. In another embodiment, injection of steam with the one or more hydrocarbon solvent can be carried out in a similar fashion. In the embodiment of the present invention, the hydrocarbon solvent to steam ratio can be of at least from about 0.01:1 to about 5:1 v/v. In the embodiment, the hydrocarbon solvent to steam ratio can be from about 0.1:1 to about 2:1 v/v.

In one embodiment, the one or more hydrocarbon solvents are first injected into the heavy hydrocarbon and then the one or more asphaltene precipitant additives are injected into the mixture of hydrocarbon solvent(s) and heavy hydrocarbon. In another embodiment, the one or more asphaltene precipitant additives are first injected into the heavy hydrocarbon and then the one or more hydrocarbon solvents are injected into the mixture of the one or more asphaltene precipitant additives and heavy hydrocarbon. In yet another embodiment, the one or more asphaltene precipitant additives and one or more hydrocarbon solvents are injected simultaneously into the heavy hydrocarbon. In yet another embodiment, the one or more asphaltene precipitant additives are added either to the hydrocarbon solvent first or directly to the steam/solvent mixture.

Following the injection step, the same production well is then operated under production conditions so as to produce an upgraded hydrocarbon product as desired. In one embodiment, once the upgraded hydrocarbon composition has been produced, the upgraded hydrocarbon can first be transported by way of, for example, a pipeline, and then further transported by another transportation carrier to a desired location such as a refinery for further processing as described hereinabove. For example, the upgraded hydrocarbon can be transported through a pipeline to a ship terminal where the upgraded hydrocarbon is then further transported on a ship to a desired refinery.

Independent of the type of oil production process, e.g. Huff and Puff (discontinuous) or continuous solvent injection in either the presence or absence of steam, the volume of heavy hydrocarbon to be contacted by the solvent can be determined by computing the oil in place in the reservoir. There are well established methods to calculate this volume. For example, in the volumetric method (Petroleum Engineering Handbook, H. B. Bradley ed., Third Printing, Society of Petroleum Engineers, Richardson, Tex., U.S.A. 1987, p 40-4), the volume of oil present in the reservoir can be computed using eq. 1:

$$N = (7{,}758\, V_o\, \phi S_o)/B_o \quad (1)$$

where:

N=Original oil in place of the reservoir in barrels;
$\phi$=Porosity of the reservoir;
$V_o$=Volume of the oil bearing rock of the reservoir in acre-ft;
$S_o$=Oil saturation;
$B_o$=Ratio of the volume of oil at reservoir (in-situ) conditions to that at stock tank (surface) conditions;
7,758=Number of barrels per acre-ft.

The values of $V_o$, $\phi$, $S_o$ and $B_o$ are obtained from the reservoir logs and producing fluids by methods well established in the prior art. Similarly, other methods to estimate the volume of heavy hydrocarbon to be contacted by the solvent can be used as well. By way of example, and not limitation, such methods include:: Material-Balance Method (Petroleum Engineering Handbook, p 40-6), Saturated Depletion Method (Petroleum Engineering Handbook, p 40-8), etc.

The methods referred above are used to determine the volume of the heavy hydrocarbon to be contacted by the hydrocarbon solvents after downhole injection. In accordance with the present invention, one or more hydrocarbon solvents and one or more asphaltene precipitant additives are injected into the well in any order at a ratio by volume of the solvent to the heavy hydrocarbon of at least from about 0.1:1 to about 20:1 under reservoir conditions so as to provide an upgraded hydrocarbon in the reservoir. In general, the one or more asphaltene precipitant additives are injected into the heavy hydrocarbon at a ratio by weight of the one or more asphaltene precipitant additives to the one or more hydrocarbon solvents of at least from about 10 ppm:1 to about 10000 ppm: 1. In one embodiment, the one or more asphaltene precipitant additives are injected into the heavy hydrocarbon at a ratio by weight of the one or more asphaltene precipitant additives to the one or more light solvents of at least from about 50:1 to about 1000 ppm.

The following non-limiting examples are illustrative of the present invention.

EXAMPLE 1

Figure 3:
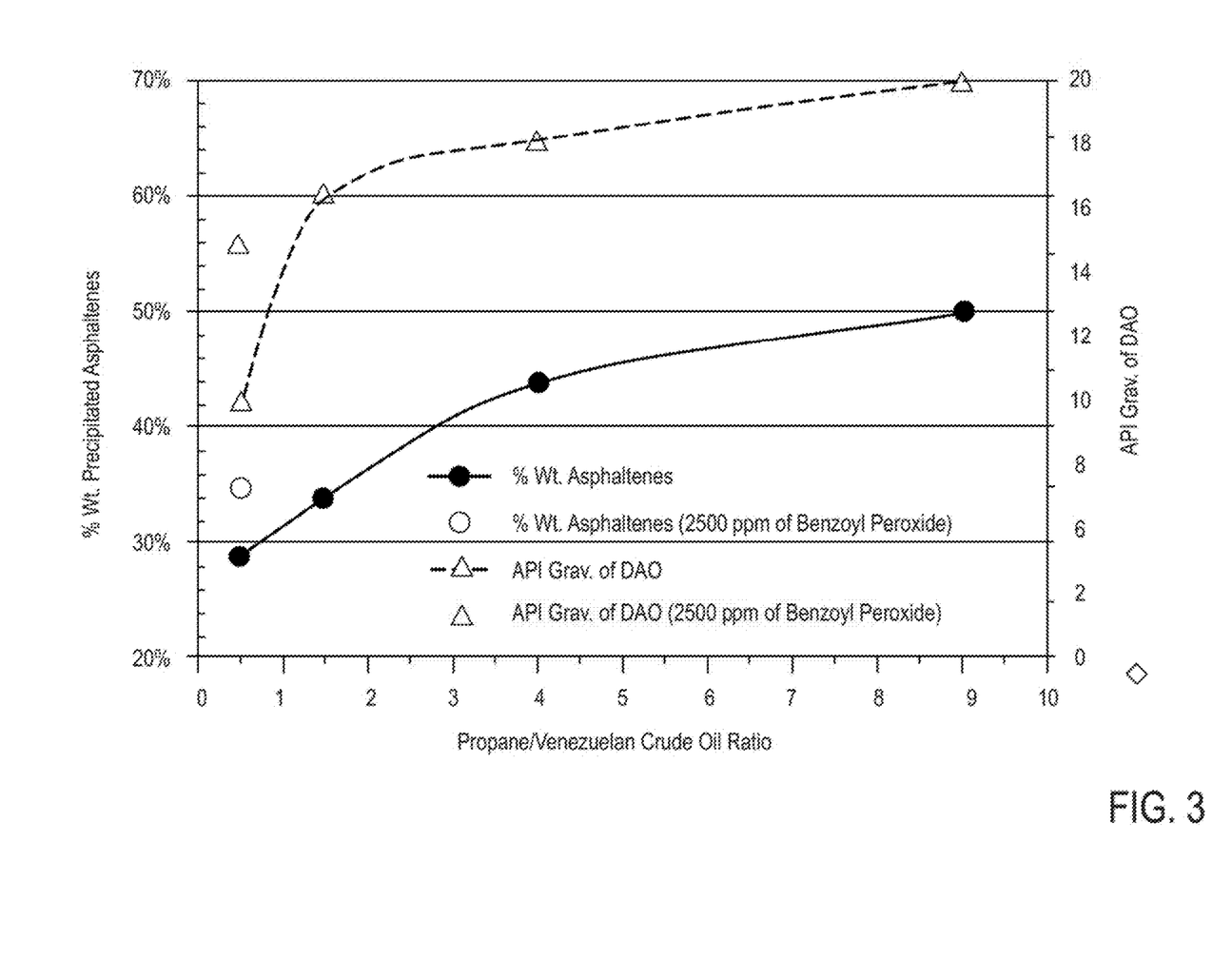
FIG. 3 shows the percentages of asphaltenes and the API gravities of the DAO versus the propane/Venezuelan Crude Oil volume ratio and the effect of benzoyl peroxide as an asphaltene precipitant additive.

10 g of Venezuelan Crude Oil containing 72 standard cubic feet of methane per barrel were admixed with different volumes of propane (solvent) at 0.5, 1.5, 4 and 9 volume ratios and stirred at 50° C. under 900 psi of pressure for several hours. The solvent induces some asphaltenes to precipitate from oil and solvent solution. For each propane/Venezuelan Crude Oil ratio sample and after phase separation of the precipitated asphaltenes from the solution and gas stripping of the methane and propane from the solution, the API gravity of the asphaltene-depleted phase corresponding to the deasphalted oil (DAO) and the mass of the bottom phase corresponding to the precipitated asphaltenes were determined. In FIG. 3, the weight percentages of asphaltenes and the API gravities of the DAO were plotted versus the propane/Venezuelan Crude Oil volume ratio. As can be seen, when the propane/crude oil ratio is 0.5, the percentage of precipitated asphaltenes is 29% wt. and the DAO API gravity is 9° API.

In the next experiment (FIG. 3), 2500 ppm of the asphaltene precipitant benzoyl peroxide was added to a propane/Venezuelan crude oil mixture at the same 0.5 vol. ratio. Increases in the percentage of asphaltenes (35% wt.) and DAO API gravity (11° API) were observed in comparison with the sample without asphaltene precipitant (FIG. 3). In net terms, the use of asphaltene precipitant additive is equivalent of carrying out the asphaltene precipitation at a higher propane/Venezuelan crude oil ratio (e.g., 1:1).

In other words, the use of asphaltene precipitant additive allows the use of a lower hydrocarbon solvent/heavy hydrocarbon ratio and, at the same time obtaining a better quality DAO (higher API). The use of lower hydrocarbon solvent/heavy hydrocarbon ratios yields in savings in the amount of hydrocarbon solvent use with the concomitant reduction in capital and operating costs.

EXAMPLE 2

Figure 4A:
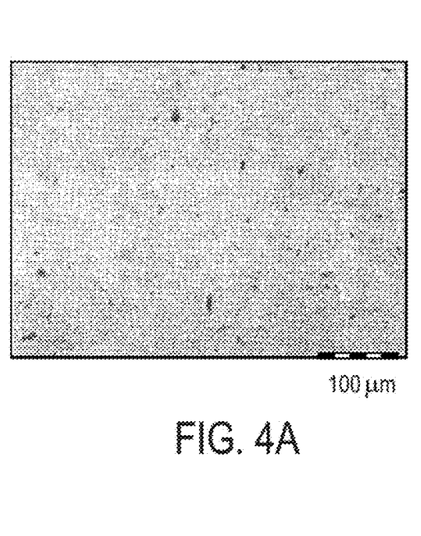
FIG. 4 shows the effect of asphaltene precipitant additives in a 4:1 Venezuelan Crude-1/n-heptane blend.

2 g of Venezuelan Crude Oil (7.7° API) were mixed with 8 g of n-heptane and completely homogenized under sonication for 1 h. A sample of this blend was placed in an optical microscopy and kept at a constant temperature of 50° C. during 30 minutes. Photographs were taken at the end of the 30 min period. As can be seen in FIG. 4A, a very small amount of asphaltene particles with dimensions lower than 25 µm can be observed for this blend.

Figure 4B:
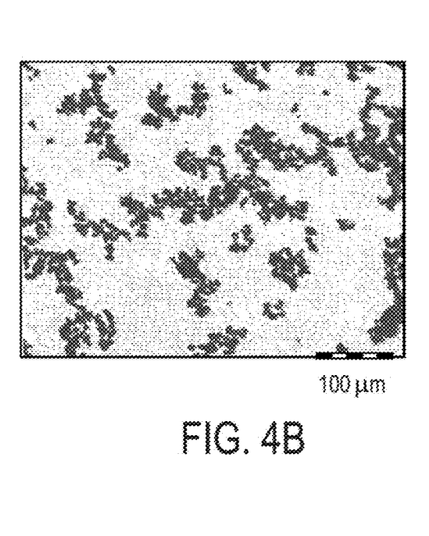

A new 4:1 Venezuelan Crude Oil-1/n-heptane blend was prepared and 100 ppm of the polymeric asphaltene precipitant additive poly(maleic anhydride alt 1 octadecene) was added. The blend was analyzed by optical microscopy following the procedure mentioned above. As can be seen in FIG. 4B, a larger amount of asphaltenes particles can be clearly observed than in FIG. 4A.

Figure 4C:
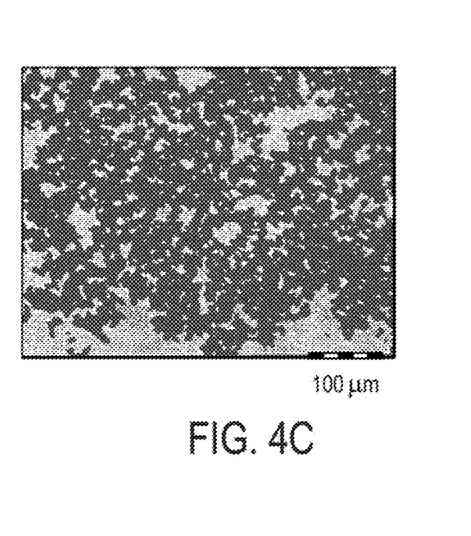

Another new 4:1 Venezuelan Crude Oil-1/n-heptane blend was prepared and 100 ppm of the $Fe_2O_3$ nanoparticles was added. The blend was analyzed by optical microscopy following the procedure mentioned above. As can be seen in FIG. 4C, an even larger amount of asphaltenes particles can be easily seen in the sample.

This example clearly demonstrates that the addition of asphaltene precipitant additives (polymeric and metal nanoparticles) increases the amount of precipitated asphaltene present in the hydrocarbon solvent/heavy hydrocarbon blends. Accordingly, these asphaltene precipitant additives can be added downhole to increase the amount of asphaltenes precipitated out into the reservoir formation and to reduce the amount of solvent needed with the concomitant savings in capital and operating costs during the production and transportation of heavy hydrocarbons.

EXAMPLE 3

0.1 grams of Venezuelan Crude Oil-1 (7.7° API) were dissolved in 10 mL of dichloromethane. This solution was analyzed by asphaltene content using the on-column filtration method reported in the literature (see, e.g., Rogel et al., Energy & Fuel, 23, 4515-4521 (2009)) at reservoir temperatures (60° C.). Next, 100 ppm of different asphaltene precipitant additives was added and the samples were analyzed for asphaltene content using the same methodology as before at the reservoir temperatures (60° C.). The results are shown below in Table 1.

TABLE 1

Percentages of Asphaltene Contents before and after using Asphaltene Precipitants

| Additive | % Wt. Asphaltenes |
|---|---|
| No additives | 10.11 |
| Benzoyl Peroxide | 10.83 |
| 4 vinyl pyridine methacrylate | 10.37 |
| 4-vinyl phenol methacrylate | 10.74 |
| $Fe_2O_3$ Nanoparticles | 10.42 |
| NiO Nanoparticles | 10.60 |
| Polymaleic anhydride | 10.26 |

As can be seen in Table 1, the use of 100 ppm of asphaltene precipitant additives increases the asphaltene content as determined by the on-column filtration technique. The percent of increment of the asphaltenes can be calculated using eq. 2:

% Inc. Asphaltenes=(% Wt. Asphaltene no additive−% Wt. with Additive)/×100% Wt. Asphaltene no additive    (2)

Figure 5:
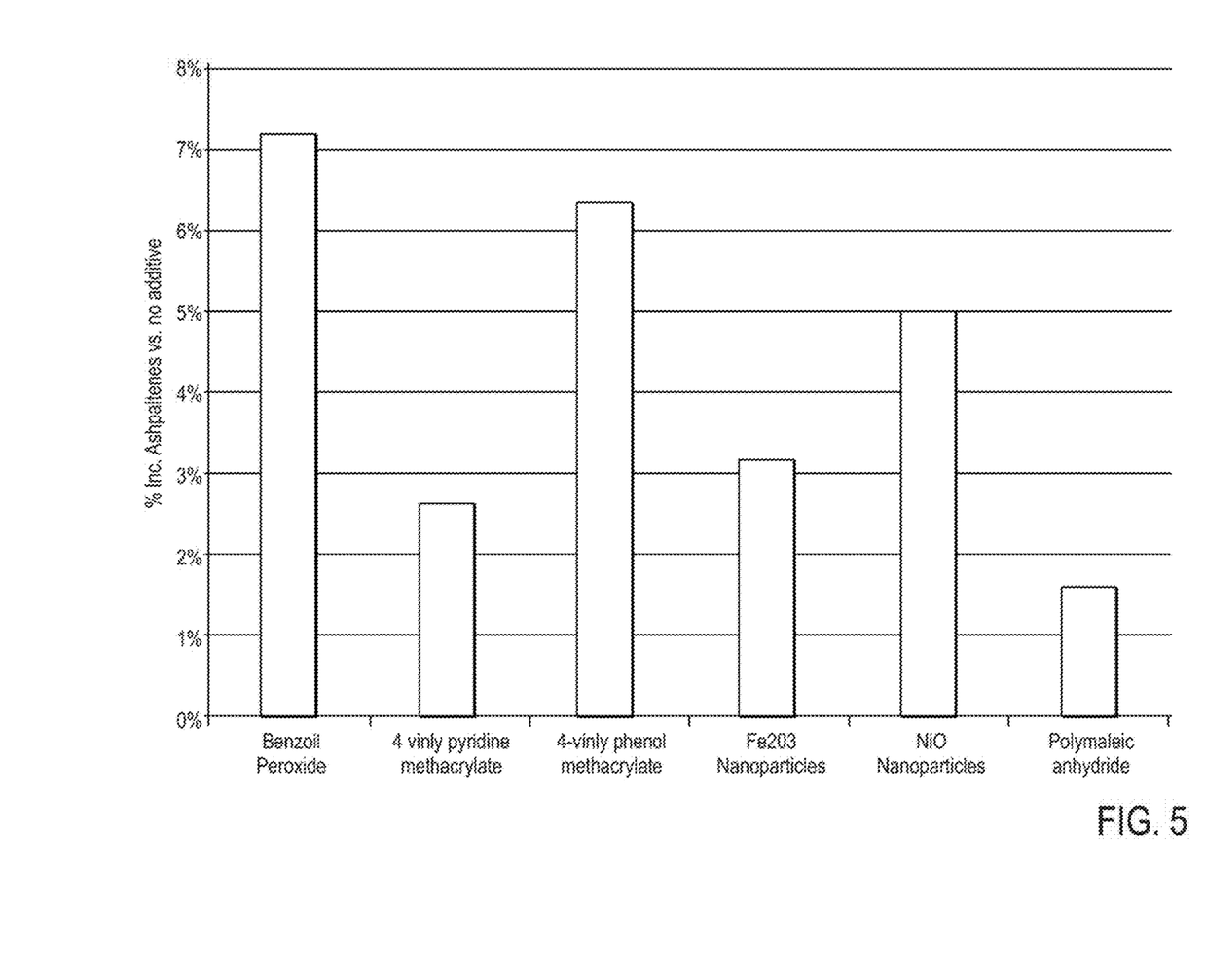
FIG. 5 shows the percent of increment of asphaltene content by using asphaltene precipitant additives.

As can be seen in FIG. 5, the addition of asphaltene precipitant additives increased the amount of asphaltenes present. As mentioned, these asphaltene precipitant additives can be added downhole to increase the amount of asphaltenes precipitated into the reservoir formation and to reduce the amount of solvent needed for the production and transportation of heavy hydrocarbons.

EXAMPLE 4

Figure 6:
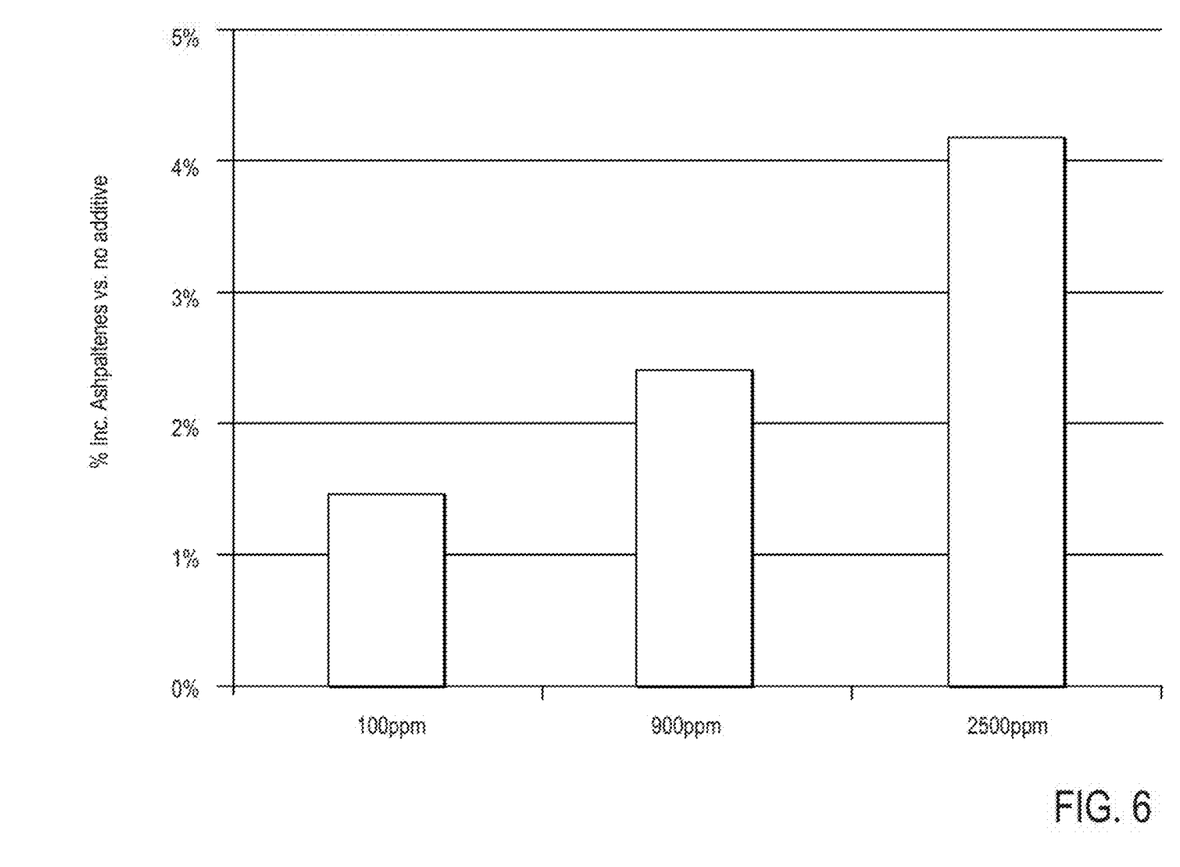
FIG. 6 shows the percent of increment of asphaltene contents by using benzoyl peroxide as an asphaltene precipitant additive.

Following substantially the same methodology as Example 2, 100 ppm, 900 ppm and 2500 ppm of benzoyl peroxide were used as asphaltene precipitant additives in the Venezuelan Crude 1. As can be seen in FIG. 6, up to 21% of increment of asphaltene content was obtained.

It will be understood that various modifications may be made to the embodiments disclosed herein. Therefore the above description should not be construed as limiting, but merely as exemplifications of preferred embodiments. For example, the functions described above and implemented as the best mode for operating the present invention are for illustration purposes only. Other arrangements and methods may be implemented by those skilled in the art without departing from the scope and spirit of this invention. Moreover, those skilled in the art will envision other modifications within the scope and spirit of the claims appended hereto.

What is claimed is:

1. A process for in situ upgrading of a heavy hydrocarbon comprising the steps of:
    (a) positioning a well in a reservoir containing a heavy hydrocarbon having an initial API gravity of less than or equal to about 20, an n-heptane asphaltene content as measured by the ASTM D-6560 of at least about 1 wt. %, and a viscosity at 35° C. greater than about 350 centistokes (cSt);
    (b) injecting one or more hydrocarbon solvents and one or more asphaltene precipitant additives into the well in any order at a ratio by volume of the solvent to the heavy hydrocarbon of from about 0.1:1 to about 20:1 under reservoir conditions so as to provide a blend containing an upgraded hydrocarbon and precipitated asphaltenes in the reservoir, wherein the upgraded hydrocarbon has an improved API gravity greater than the initial API gravity, a reduced asphaltene content as compared with the heavy hydrocarbon, and a lower viscosity as compared with the heavy hydrocarbon and wherein the blend contains precipitated asphaltenes in a higher amount than in a similar blend not containing the one or more asphaltene precipitant additives; and
    (c) producing the upgraded hydrocarbon from the well without the precipitated asphaltenes such that the precipitated asphaltenes remain in the reservoir.

2. The process of claim 1 wherein the one or more hydrocarbon solvents are injected at a ratio by volume of the solvent to the heavy hydrocarbon of about 0.1:1 to about 1.5:1.

3. The process of claim 1 wherein the one or more hydrocarbon solvents are injected at a ratio by volume of the solvent to the heavy hydrocarbon of about 0.1:1 to less than 1:1.

4. The process of claim 1 wherein the one or more hydrocarbon solvents are injected at a ratio by volume of the solvent to the heavy hydrocarbon of about 0.1:1 to about 0.9:1.

5. The process according to claim 1, wherein the heavy hydrocarbon having an initial API gravity of less than or equal to about 20 comprises a heavy crude oil or an extra heavy crude oil.

6. The process according to claim 1, wherein the one or more hydrocarbon solvents include a C1-C8 hydrocarbon solvent.

7. The process according to claim 1, wherein the one or more hydrocarbon solvents are selected from the group consisting of propane, butane and mixtures thereof in liquid or gas form.

8. The process according to claim 1, wherein the one or more hydrocarbon solvents comprise C1-C10 fractions.

9. The process according to claim 1, wherein the one or more asphaltene precipitant additives are injected into the heavy hydrocarbon at a ratio by weight of the one or more asphaltene precipitant additives to the one or more hydrocarbon solvents of from about 10 ppm:1 to about 10000 ppm:1.

10. The process according to claim 1, wherein the one or more asphaltene precipitant additives are injected into the heavy hydrocarbon at a ratio by weight of the one or more asphaltene precipitant additives to the one or more hydrocarbon solvents of from about 50:1 to about 1000 ppm:1.

11. The process according to claim 1, wherein the one or more asphaltene precipitant additives are peroxide containing asphaltene precipitant additives.

12. The process according to claim 11, wherein the one or more peroxide asphaltene precipitant additives are selected from the group consisting of lauroyl peroxide, benzoyl peroxide, 2,4-dichlorobenzoyl peroxide, m-toluoyl peroxide, peroxyacetic acid, 2,5-oxanoyl peroxide, succinic peroxide, diisopropylbenzene hydroperoxide, paramethane hydroperoxide, pinane hydroperoxide, cumene hydroperoxide, p-menthane hydroperoxide, tert-butyl peroxyacetate, tert-butyl peroxypivalate, tert-butyl peroxyneodecanoate, tert-butyl peroxyoctanoate, methyl ethyl ketone peroxide, acetone peroxide, acetylacetone peroxide, cyclohexanone peroxide, methylcyclohexanone peroxide, m-chloroperoxybenzoic acid, di-t-butyl peroxide, t-butylcumyl peroxide, t-butyl hydroperoxide, 2,5-dimethylhexane-2,5-dihydroperoxide, 2,5-dimethyl-2,5-di(t-butylperoxy)hexane, 1,1-bis(t-butyl-peroxy)cyclohexane, 2,2-bis(tert-butylperoxy)-butane, 2,5-dimethyl-2,5-dibenzoylperoxy-hexane, 1,3-bis(t-butyl-peroxyisopropyl)-benzene, 3,3,5-trimethylcyclohexanone peroxide, 1,1-bis(t-butyl-peroxy)-3,3,5-trimethylcyclohexane, dicumyl peroxide, and dimethylstyryl peroxydicarbonate.

13. The process according to claim 1, wherein the one or more asphaltene precipitant additives are polymeric methacrylate containing asphaltene precipitant additives.

14. The process according to claim 13, wherein the one or more polymeric methacrylate asphaltene precipitant additives are selected from the group consisting of 4-vinyl pyridine methacrylate, 4-vinyl phenol methacrylate, polymaleic anhydride and mixtures thereof.

15. The process according to claim 1, wherein the one or more asphaltene precipitant additives are nanoparticles of metal oxides, wherein the metal is selected from the group consisting of a Group 8 metal, Group 9 metal, Group 10 metal, copper and zinc.

16. The process according to claim 1, wherein the one or more asphaltene precipitant additives are nanoparticles of iron oxide, nickel oxide, ruthenium oxide, platinum oxide and palladium oxide.

17. The process according to claim 1, wherein the one or more asphaltene precipitant additives are sulphonic acid containing asphaltene precipitant additives.

18. The process according to claim 1, wherein the initial reservoir conditions include a temperature of between about 40° C. and about 140° C.

19. The process according to claim 1, wherein the reservoir conditions include a pressure of between about 250 psia to about 2500 psia.

20. The process according to claim 1, wherein the one or more hydrocarbon solvents are first injected into the heavy hydrocarbon and then the one or more asphaltene precipitant additives are injected into the mixture of hydrocarbon solvent and heavy hydrocarbon.

21. The process according to claim 1, wherein the one or more asphaltene precipitant additives are first injected into the heavy hydrocarbon and then the one or more hydrocarbon solvents are injected into the mixture of the one or more asphaltene precipitant additives and heavy hydrocarbon.

22. The process according to claim 1, wherein the one or more hydrocarbon solvents and one or more asphaltene precipitant additives are injected simultaneously into the heavy hydrocarbon.

23. The process according to claim 1, wherein steam is injected along with the one or more hydrocarbon solvents and the one or more asphaltene precipitant additives in any order.

24. The process according to claim 1, wherein the one or more asphaltene precipitant additives comprise an additive selected from the group consisting of peroxides, polymeric methacrylates, nanoparticles of metal oxides, sulphonic acids and combinations thereof.

25. The process according to claim 1, wherein the blend contains precipitated asphaltenes in an amount at least 1.5 wt. % higher than in a similar blend not containing the one or more asphaltene precipitant additives.

26. The process according to claim 1, wherein the blend contains precipitated asphaltenes in an amount at least 5 wt. % higher than in a similar blend not containing the one or more asphaltene precipitant additives.

* * * * *